E. Buss,
Aerating Bread,
Nº 56,002. Patented July 3, 1866.
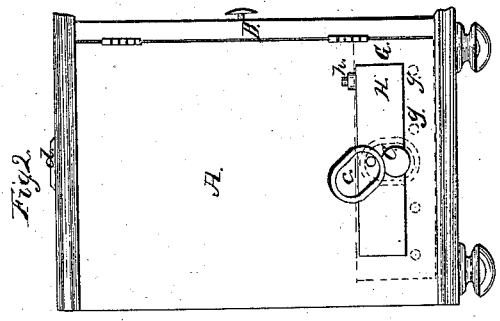
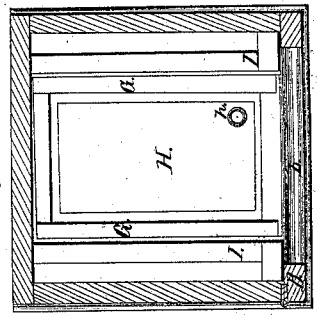
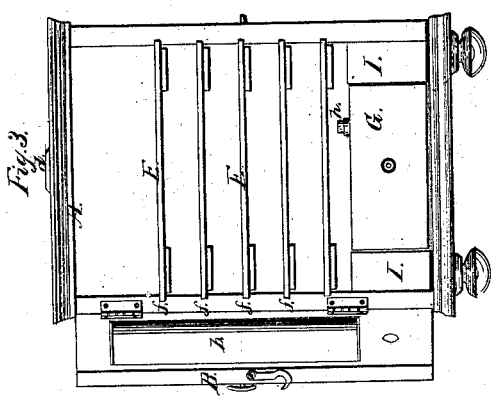
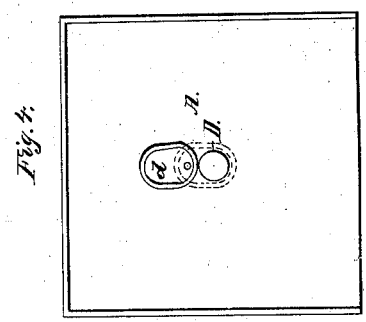
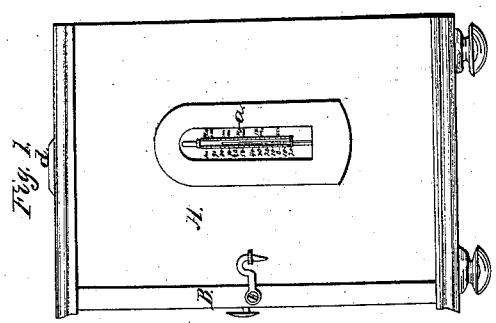
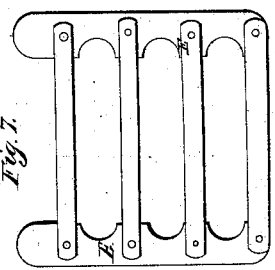
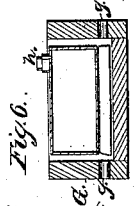
Witnesses.
Thomas J Parker
E J Ward.
Inventor.
Ezra Buss
By his atty,
J S Brown

UNITED STATES PATENT OFFICE.

EZRA BUSS, OF SPRINGFIELD, OHIO.

IMPROVED APPARATUS FOR RAISING BREAD.

Specification forming part of Letters Patent No. 56,002, dated July 3, 1866.

*To all whom it may concern:*

Be it known that I, EZRA BUSS, of Springfield, in the county of Clark and State of Ohio, have invented a new and Improved Apparatus for Raising Bread; and I do hereby declare that the following is a full and exact description thereof, reference being had to the accompanying drawings, making part of this specification.

Figure 1 is an elevation of one side of the apparatus; Fig. 2, an elevation of the other side thereof; Fig. 3, a front elevation of the same, the door being swung open to show the inside arrangement; Fig. 4, a top view of the same; Fig. 5, a horizontal section in a plane indicated by the line $x$ $x$, Figs. 1, 2, and 3; Fig. 6, a transverse vertical section of the hot-water vessel and of the drawer in which it is situated; Fig. 7, a top view of one of the racks which support the pans or dishes containing the dough to be raised.

Like letters designate corresponding parts in all of the figures.

The object of my invention is to provide a means for keeping dough at an elevated and even temperature proper to start and keep up the fermentation till brought to a requisite point for baking the bread, and this with little or no care and attendance.

I provide a close box or chamber, A, which may be made of wood or other material that will retain heat well, may have any desired shape, and be of a size suitable to the capacity desired. A door, B, opens at the front side in order to gain access to the interior.

Racks E E are provided for sustaining the bread pans or dishes, and, that they may be adapted to different heights of dishes, they are made to slide in any of a set of grooves, $f$ $f$, in the inner surfaces of the sides of the box A, as shown in Fig. 3.

In the bottom part of the box or chamber is placed the heat giving and sustaining device, and, since it is necessary to continue the heat at a moderate degree and for a considerable length of time, the heat must be given out very gradually and constantly.

I find that hot water furnishes a very suitable heat-supplying medium; but since it is necessary to have a dry atmosphere in the raising-chamber, and in order that the heat may not be dissipated therefrom too rapidly by its evaporation, I place it in a tight vessel, H, having only an aperture for pouring in and out the water, to be closed by a stopper, $h$. Also, in order that no unnecessary waste of heat may take place by side and downward radiation, and thus keep up the temperature above it for a longer time, the hot-water vessel is situated in a box, G, open at the top only. This box is most conveniently arranged as a drawer, for convenience in putting in and taking out the vessel. The drawer is narrower than the chamber, and side guides, I I, are used to keep the drawer in the proper position.

In order that a circulation of air may be kept up around the hot-water vessel and equalize the temperature in the raising-chamber, the vessel H is kept raised somewhat above the bottom of the drawer G, and does not completely fill it at the sides, and holes $g$ $g$, Figs. 2 and 6, are made through the sides of the drawer G, near the bottom, for admitting the cold air at the bottom of the chamber, to circulate freely around the hot-water vessel.

Instead of a close hot-water vessel, a brick or soap-stone may be employed, though generally its use is not so convenient as that of hot water.

A thermometer, $a$, Fig. 1, is situated in the raising-chamber, having glass over it to show outside the degree of temperature indicated by it. The temperature for producing the fermentation should never fall as low as 50° nor rise higher than 85° Fahrenheit. The best temperature is from 70° to 80°.

In order to introduce fresh air to keep up the fermentation and to regulate the temperature inside when necessary, an opening, C, is made through one side of the box or chamber A, near the bottom, and this aperture is wholly or partly covered by a valve, $c$, by which the amount of air admitted is regulated at will; and in order to furnish an outlet for the gas generated by the fermentation an aperture, D, is made in the top of the box or chamber, to be closed or partially closed by a valve, $d$, as required.

A window or glass, $b$, is put in the door B, in order to view the progress of the fermentation without opening the door, and thereby lowering the temperature within.

What I claim as my invention, and desire to secure by Letters Patent, is—

1. A box or chamber, A, for receiving the dough to be raised, when provided with a close vessel filled with heated water for communicating a very gradual continuous dry heat to the atmosphere within the chamber, and arranged and operating substantially as herein specified.

2. Locating the hot-water vessel H in a drawer, G, closed except at the top, and provided with apertures near the bottom, substantially as and for the purposes herein set forth.

3. Providing the chamber with an opening, C, controlled by a valve, c, for the purpose of admitting fresh air therein and of regulating the temperature inside, as herein described.

4. The opening D in the top, controlled by a valve, d, for the purpose specified.

5. The use of a thermometer, a, in combination with the apparatus, arranged substantially as specified.

6. The use of the glass b in the door or side, for the purpose set forth.

The above specification of my new and improved apparatus for raising bread signed by me this 12th day of January, 1866.

EZRA BUSS.

Witnesses:
JAS. L. TORBERT,
AMOS BARR.